United States Patent [19]

Yanagita et al.

[11] 4,405,025
[45] Sep. 20, 1983

[54] ELECTRONIC WEIGHING APPARATUS OF INDUCTION TYPE

[75] Inventors: Shuichi Yanagita; Tsutomu Miyoshi; Masashi Miyane, all of Tokyo, Japan

[73] Assignee: Tanita Corporation, Tokyo, Japan

[21] Appl. No.: 302,623

[22] Filed: Sep. 15, 1981

[30] Foreign Application Priority Data

Jun. 15, 1981 [JP] Japan .................................. 56/90833

[51] Int. Cl.³ .......................... G01G 3/14; G01G 21/08
[52] U.S. Cl. ................................ 177/210 FP; 177/256
[58] Field of Search .......................... 177/210 FP, 256

[56] References Cited

U.S. PATENT DOCUMENTS 4,173,263 11/1979 Meeks ............................. 177/256 X

FOREIGN PATENT DOCUMENTS 52-54654 4/1977 Japan .
56-29124 3/1981 Japan .

Primary Examiner—George H. Miller, Jr.
Attorney, Agent, or Firm—Kerkam, Stowell, Kondracki & Clarke

[57] ABSTRACT

An electronic weighing apparatus of induction type comprises a weighing member adapted to be moved according to the weight of a load to be measured, a variable inductance element consisting of a coil and a magnetic core which is movable relatively to the coil through the coil, a connecting member for connecting the weighing member with one of the coil and the magnetic core of the inductance element so that the one can be moved with respect to the other according to the movement of the weighing member and thus the inductance of the inductance element can be changed proportionally to the movement of the weighing member, a sensor oscillator including the variable inductance element as one of its oscillating parameters for generating a series of pulses having a characteristic representative of the inductance of the variable inductance element, a converting circuit for converting the characteristic of the output pulses from the sensor oscillator into a weight signal indicative of the weight of the load, and a display for receiving the weight signal from the converting circuit and providing an indication of the weight of the load.

14 Claims, 6 Drawing Figures

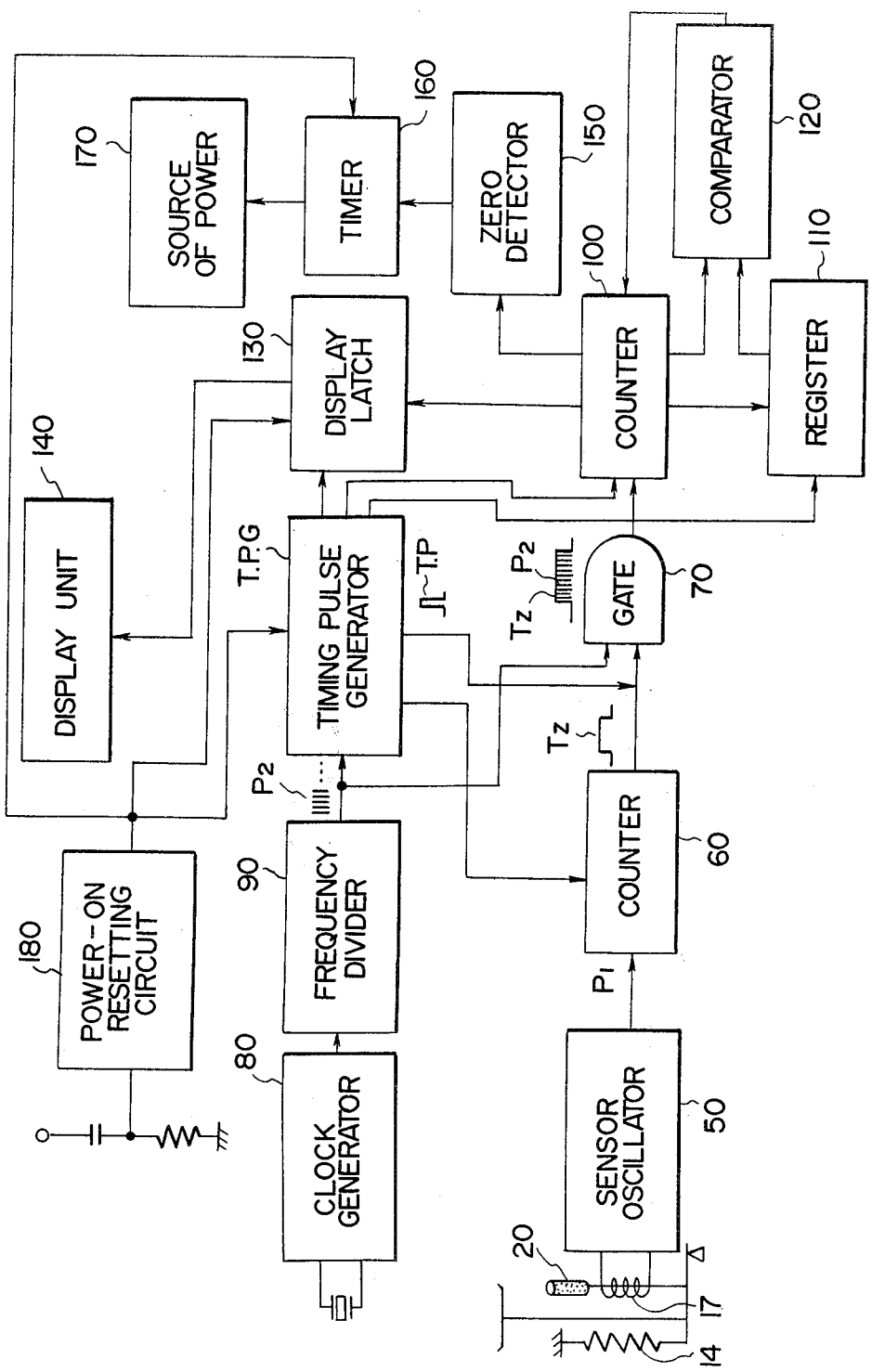
F I G. 3

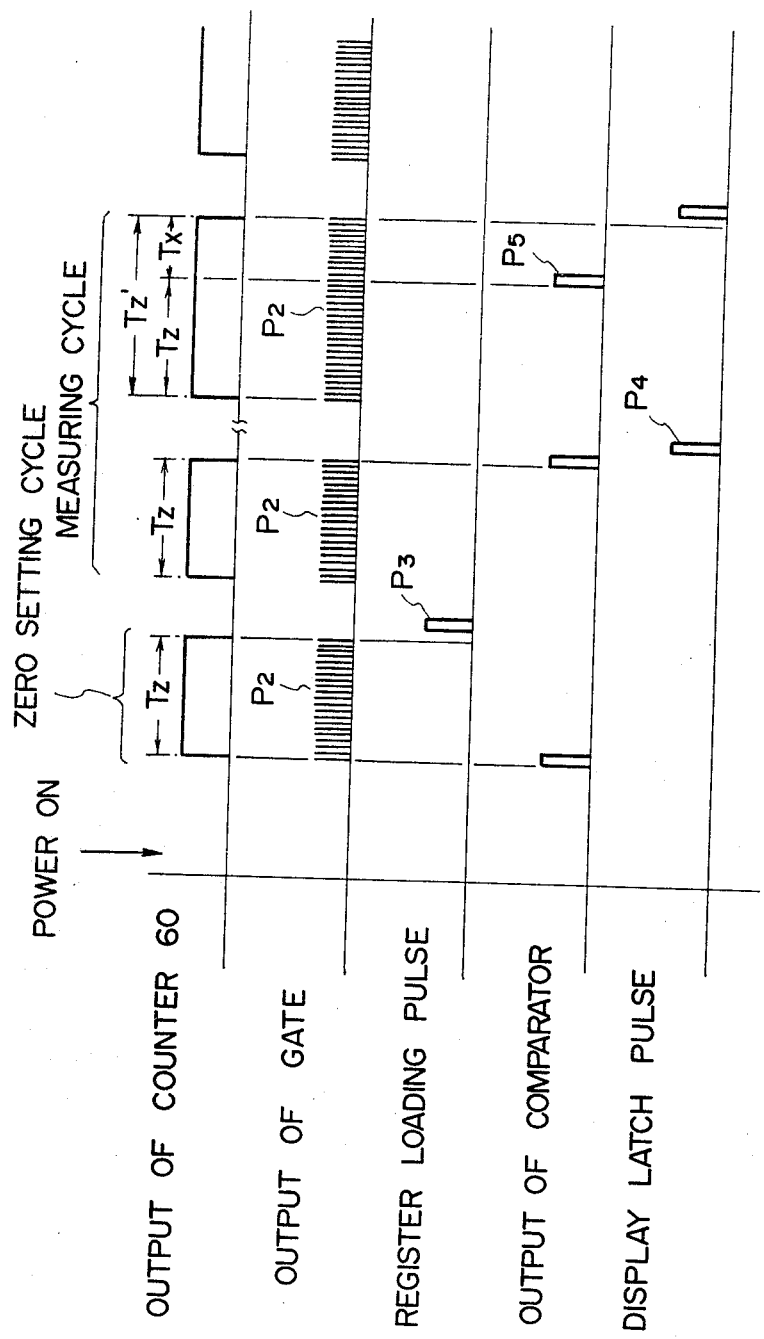

ELECTRONIC WEIGHING APPARATUS OF INDUCTION TYPE

BACKGROUND OF THE INVENTION

1. Field of the Invention

This invention generally relates to a weighing apparatus, and more particularly to an electronic weighing apparatus.

2. Description of the Prior Art

Among electronic weighing apparatus employing an electric coil, there was heretofore developed and used an electronic weighing apparatus of the voltage type wherein a differential transformer is provided for converting the weight of a load to be measured into a voltage and an analog to digital conversion of the voltage is made to provide an indication of the weight of the load. However, the voltage-type electronic weighing apparatus has the following disadvantages: since the differential transformer has a primary winding and a secondary winding, there are a number of lead wires which result in a cumbersome handling of the lead wires; and an analog to digital converting circuit is needed, whereby it is very difficult and troublesome to compensate changes in temperature and humidity and the total cost of the apparatus is increased.

Therefore, an object of this invention is to provide an electronic weighing apparatus of induction type eliminating the above mentioned disadvantages.

SUMMARY OF THE INVENTION

An electronic weighing apparatus of induction type according to this invention comprises a weighing member adapted to be moved according to the weight of a load to be measured, a variable inductance element consisting of a coil and a magnetic core which is movable relatively to the coil through the coil, a connecting member for connecting the weighing member with one of the coil and the magnetic core of the inductance element so that the one can be moved with respect to the other according to the movement of the weighing member and thus the inductance of the inductance element can be changed proportionally to the movement of the weighing member, a sensor oscillator including the variable inductance element as one of its oscillating parameters for generating a series of pulses having a characteristic representative of the inductance of the variable inductance element, a converting circuit for converting the characteristic of the output pulses from the sensor oscillator into a weight signal indicative of the weight of the load, and a display for receiving the weight signal from the converting circuit and providing an indication of the weight of the load.

BRIEF DESCRIPTION OF THE DRAWINGS

FIG. 3 is a block diagram of the electronic circuit used in the weighing apparatus of FIG. 1;

FIG. 6 is a timing chart for the weighing apparatus of FIG. 1.

DESCRIPTION OF THE PREFERRED EMBODIMENTS

Figure 1:
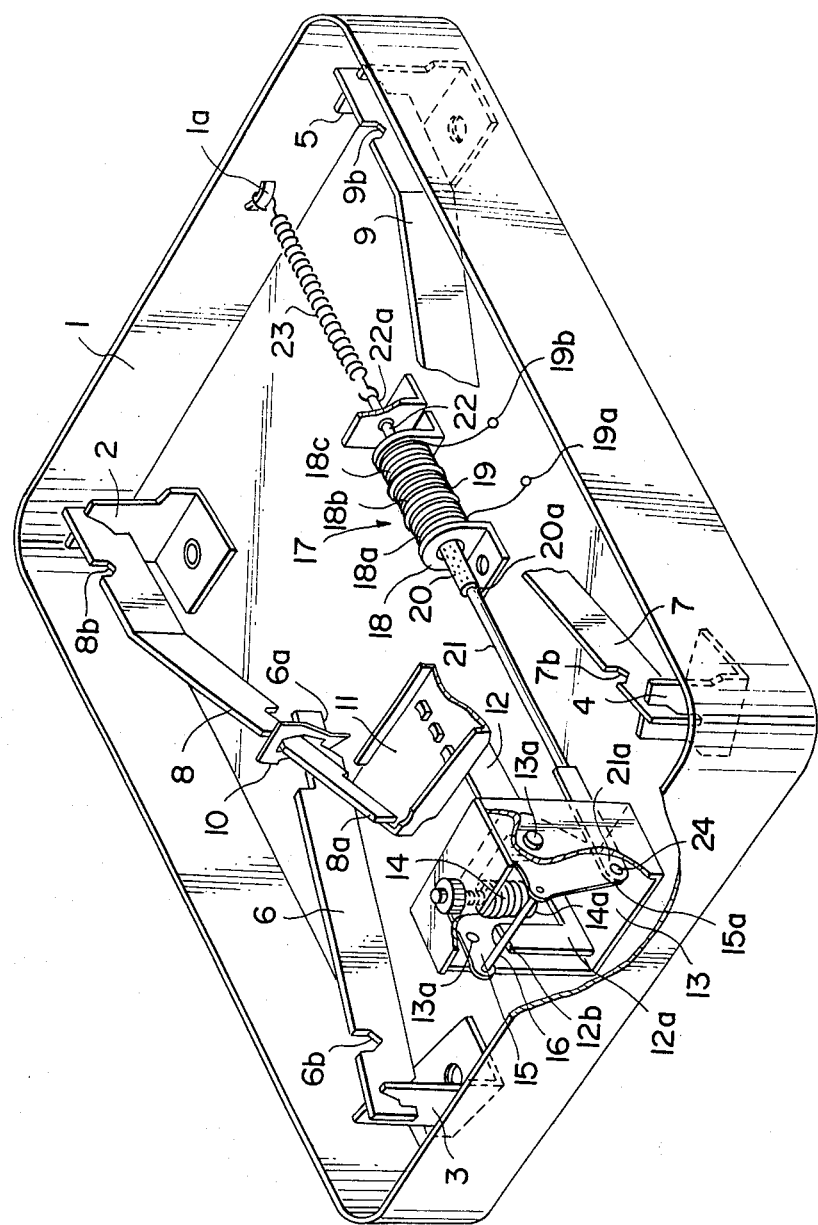
FIG. 1 is a partially broken away perspective view of an embodiment of electronic weighing apparatus of the induction type in the form of a platform scale according to this invention.

Referring now to FIG. 1, there is shown a platform scale having a base 1 as constructed in accordance with this invention. The base 1 is provided at its corners with blade supporting members 2, 3, 4 and 5. Short links 6 and 7 are supported on their one ends by the supporting members 3 and 4 respectively, and long links 8 and 9 are supported on their one ends by the supporting members 2 and 5 respectively. The other ends 6a and 7a of the short links 6 and 7 are suspended from the intermediate portions of the long link 8 and 9 by means of suspending rings 10. The other ends 8a of the long links 8 and 9 are fixedly connected to an interconnecting plate 11.

A supporting frame 13 is mounted on the base 1 and a main spring 14 is mounted on the frame 13 so as to be suspended from the frame 13. A lever 12 is secured at one end thereof to the central portion of the interconnecting plate 11 and is connected at an intermediate portion to the lower end 14a of the main spring 14. A link 15 is pivotally secured to the frame 13 by means of pivotal pins 13a. The link 5 has a link rod 16 the intermediate portion of which is adapted to bear against the top end 12b of the hanger portion 12a of the lever 12.

Figure 2:
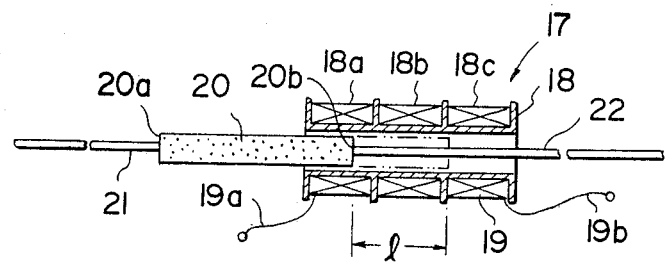
FIG. 2 is a sectional view showing in more detail the variable inductance element of the weighing apparatus of FIG. 1.

A variable inductance element is mounted on the base 1 at about a center thereof. The variable inductance element comprises a coil 17 and a magnetic core 20. As shown in the sectional view of FIG. 2, the coil 17 consists of three windings 19 which are wound around the respective ones of three blocks 18a, 18b and 18c of a hollow bobbin 18. The windings of the outer blocks 18a and 18c have a larger number of turns than that of the winding of the intermediate block 18b so as to provide a linearity of change in the inductance of the variable inductance element with the movement of the magnetic core 20 in the direction of the axis of the bobbin 18 and thus coil 17 over a wider range of the movement. Thus, to obtain a further wider range of such linearity, the bobbin 18 may be divided into a larger number of blocks and windings may be wound around each of the blocks so that the windings of the outer blocks may have a larger number of turns.

The magnetic core 20 is made of a magnetic material and is movable through the bobbin 18. The magnetic core 20 is provided at both ends 20a and 20b thereof with link bars 21 and 22. A tension spring 23 is provided between the end 22a of the link bar 22 and a hook 1a provided in the base 1. The end 21a of the link bar 21 is pivotally attached to a bearing 15a in the link 15 by means of a stopper pin 24. Thus, the magnetic core 20 is normally pulled by the tension spring 23 until the link rod 16 bears against the top end 12b of the hanger portion 12a of the lever 12.

Although in this embodiment the coil 17 is fixed to the base and the magnetic core 20 is made movable with respect to the coil 17, the magnetic core may be fixed to the base 1 and the coil may be made movable with respect to the magnetic core 20 by connecting to the link 15.

Figure 4:
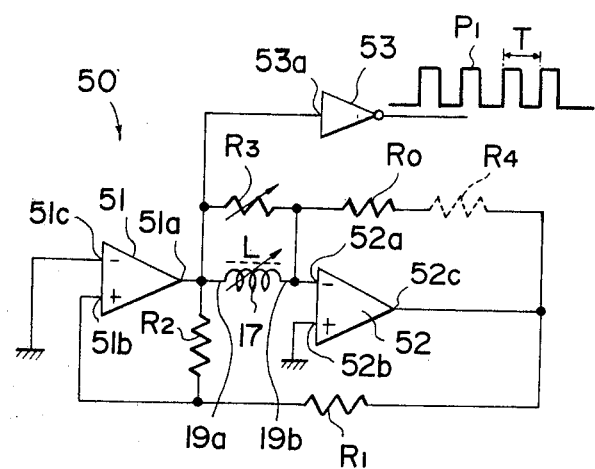
FIG. 4 is a circuit diagram of the sensor oscillator used in the weighing apparatus of FIG. 1.

FIG. 3 illustrates an electronic circuit for converting the amount of change in the inductance of the variable inductance element into a signal indicative of the weight of a load being measured. The electronic circuit includes a sensor oscillator 50. As shown in FIG. 4, the sensor oscillator 50 comprises a comparator 51 employing an operational amplifier and an integrator 52. The lead wire 19a of the windings of the coil 17 of the variable inductance element is connected to the output terminal 51a of the comparator 51 and the lead wire 19b of the windings of the coil 17 is connected to the non-inverting input terminal 52a of the integrator 52. A resistor $R_0$ is connected between the non-inverting input terminal 52a and the output terminal 52c of the integrator 52. A resistor $R_1$ is connected between the output terminal 52c of the integrator 52 and the inverting input terminal 51b of the comparator 51. The inverting input terminal 51b is connected through a resistor $R_2$ to the output terminal 51a of the comparator 51. The output terminal 51a of the comparator 51 is connected to the input terminal 53a of a NOT circuit 53 for shaping the output of the comparator 51. The non-inverting input terminal 51c of the comparator 51 and the inverting input terminal 52b of the integrator 52 are grounded. Thus, the period T of oscillating pulses generated from the sensor oscillator 50 is related to the change in inductance L of the variable inductance element by the following equation:

$$T = 4 R_2/R_1 \cdot L/R_0$$

As seen from the above equation, the period T is proportional to the inductance L.

Figure 5:
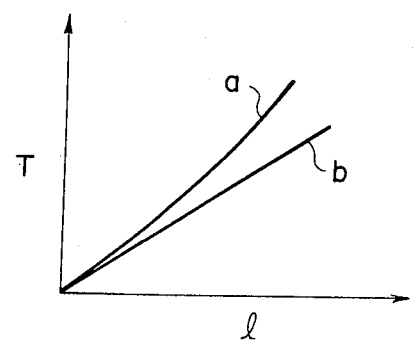
FIG. 5 graphically illustrates a degree of compensation for linearity by a compensating resistor as used in the sensor oscillator of FIG. 4.

In such sensor oscillator 50, the period T of oscillating pulses from the sensor oscillator tends to be non-linearly related to the distance l moved by the magnetic core 20 due to delays in propagation from the integrator 52 to the comparator 51 or variations in inductance of the coil 17, as shown by a curve a in FIG. 5. To compensate for such non-linearity, a compensation resistor $R_3$ may be connected across the coil 17 of the variable inductance element. The relation of the period T with the moved distance l can be made linear, as shown by a curve b in FIG. 5, by adjusting the compensation resistor $R_3$, thereby improving the accuracy of the sensor oscillator.

Moreover, to compensate for a change in oscillating pulses from the sensor oscillator due to a change in ambient temperature, a resistor $R_4$ having a positive temperature coefficient may be connected in series with the resistor $R_0$ connected to the integrator 52, or a clock generator having an opposite temperature characteristic may be used as a clock generator 80 (FIG. 3) for generating a reference clock pulse.

Returning now to FIG. 3, the electronic circuit also includes a first counter 60 which counts a predetermined number of the oscillating pulses $P_1$ from the sensor oscillator 50 and then outputs a pulse having a pulse width TZ proportional to the time required to count the predetermined number of the pulses $P_1$ (see FIG. 6). A clock generator 80 produces clock pulses $P_2$ through a frequency divider 90. A timing pulse generator T.P.G. receives clock pulses $P_2$ from the frequency divider 90 and produces a timing pulse T.P. A gate 70 is gated by the timing pulse T.P. from the timing pulse generator T.P.G. and the pulse of the pulse width TZ from the counter 60 to pass clock pulses $P_2$ from the frequency divider 90. Thus, the number of the clock pulses $P_2$ then passes through the gate 70 is proportional to the pulse width TZ of the pulse from the sensor oscillator 50.

A second counter 100 counts the clock pulses $P_2$ from the gate 70. More specifically, the counter 100 firstly counts the clock pulses $P_2$ from the gate 70 when no load is applied to the weighing apparatus, under control by the timing pulse T.P. from the timing pulse generator T.P.G. and the number of clock pulses $P_2$ counted is stored in a register 110. Then, when a load is applied to the weighing apparatus, the counter 100 counts the clock pulses $P_2$ from the gate 70 and the number of clock pulses $P_2$ then counted is processed by a cooperative operation of the register 110 and a comparator 120, as will be described, so that a weight signal representative of the weight of the load may be transmitted to a display latch 130 to cause the weight of the load to be displayed on a display unit 140.

A zero detector 150 is provided for detecting a no-load condition and turning off a source of power 170 through a cooperative operation with a timer 160 when such no-load condition continues for a predetermined time.

A power-on resetting circuit 180 is also provided for turning on the source of power 170 and simultaneously generating a reset pulse to cause the timing pulse generator T.P.G., the display latch 130 and the timer 160 to be reset.

Operation of the weighing apparatus constructed as described above will be described in connection with the timing chart of FIG. 6.

Firstly, with no load applied to the weighing apparatus, the power-on resetting circuit 180 is actuated and then a reset pulse is generated from the timing pulse generator T.P.G., whereby the timing pulse generator T.P.G., the register 110, the first counter 60, the second counter 100 and the timer 160 are reset. During such no-load condition, the first counter 60 counts a predetermined number, for example 2000 of oscillating pulses $P_1$ from the sensor oscillator 50 and then outputs a pulse having a pulse width TZ proportional to the time required to count the predetermined number of the pulses $P_1$. The gate 70 receives the pulse of the pulse width TZ from the counter 60 and clock pulses $P_2$ from the frequency divider 90 and then outputs a number of clock pulses $P_2$ proportional to the pulse width TZ. The second counter 100 counts the clock pulses $P_2$ from the gate 70. In response to a register loading pulse $P_3$ from the timing pulse generator T.P.G., the number of clock pulses $P_2$ counted by the counter 100 is stored in the register 110.

Then, the timing pulse generator T.P.G. initiates a normal measuring cycle. The counter 100 repeats such a counting operation as described above. However, when the number of clock pulses $P_2$ counted by the counter 100 becomes equal to that previously stored in the register 110, the counter 100 is again reset to zero. In response to a latch pulse $P_4$ from the timing pulse generator T.P.G., zero is displayed on the display unit 140.

In such condition, when a load to be measured is applied to the platform scale, the weight of the load is imparted to the weight receiving points 8b, 9b and 6b, 7b of the long links 8, 9 and the short links 6, 7 through the edges of a cover (not shown) for the scale. The top end 12b of the hanger portion of the lever 12 is lowered against the main spring 14 by a distance proportional to the weight of the load multiplied by the leverage of the long and short links 8, 9 and 6, 7. Then, the lower end of the link 15 is pulled by the tension spring 23 and thus the link 15 is counterclockwise rotated about the pivot 13a until the link rod 16 again bears against the top end 12b of the lever 12. As a result of this, the magnetic core 20 is also moved into the coil 17 by a distance proportional to the weight of the load, whereby the inductance of the variable inductance element is changed in proportion to the weight of the load. Since the relation between the period T of oscillating pulses $P_1$ from the sensor oscillator 50 and the inductance L of the variable inductance element 17 is represented by the equation $T = 4\ R_2/R_1 \cdot L/R_0$, as described above, it will be seen that the period T of oscillating pulses $P_1$ from the sensor oscillator 50 is increased proportionally to the weight of the load to be measured. The counter 60 then starts to count a predetermined number, for example 2000 of the oscillating pulses $P_1$. After completing such counting, the counter 60 produces a pulse having a pulse width TZ' proportional to the time required to count the predetermined number of the oscillating pulses $P_1$. The counter 100 starts to count the clock pulses $P_2$ passed through the gate 70 for a time period equal to the pulse width TZ' of the pulse from the counter 60. During such counting, when the number of clock pulses $P_2$ counted by the counter 100 becomes equal to the number of clock pulses $P_2$ counted by the counter 100 under no-load condition and previously stored in the register 110, the comparator 120 detects such condition and produces a reset pulse $P_5$ to cause the counter 100 to be reset to zero. Thereafter, the counter 100 further continues to count the clock pulses $P_2$ passed through the gate 70 until the end of the time period equal to the pulse width TZ'. Eventually, the counter 100 counts a number of clock pulses $P_2$ proportional to the increment TX in the pulse width due to the weight of the load, namely which number corresponds to the weight of the load. In response to the latch pulse $P_4$, the number corresponding to the weight of the load is transmitted to the display latch 130 to be displayed on the display unit 140.

After completing the measuring cycle, if a no-load condition continues for a few seconds, the timer 160 causes the source of power 170 to be off.

The electronic circuit may be microcomputerized so as to be more simple. Furthermore, although this invention has been described in connection with the weighing apparatus in the form of a platform scale, this invention may be applied to weighing apparatus of other various types such as an automatic counter scale. Although in the embodiment as described above the weight is displayed by counting the period of oscillating pulses $P_1$, it is also possible to display the weight by counting the frequency of the oscillating pulses $P_1$.

The weighing apparatus according to this invention constructed as described above has the following advantages:

(1) it is not sensitive to change in ambient temperature and humidity;

(2) a linearity of change in inductance with the weight of a load can be easily compensated;

(3) since the coil of the variable inductance element has a less number of lead wires, the arrangement of the lead wires is made easy;

(4) no analog-digital converter is needed; and (5) a linearity of change in inductance with the weight of a load can be obtained over a wide range, thereby resulting in an improvement in the measurement accuracy of the weighing apparatus.

We claim:

1. An electronic weighing apparatus of the induction type comprises a weighing member adapted to be moved according to the weight of a load to be measured, a variable inductance element consisting of a coil and a magnetic core which is movable relative to said coil and through said coil, means for connecting said weighing member with one of said coil and said magnetic core of said inductance element so that said one can be moved with respect to the other according to the movement of said weighing member and thus the inductance of said inductance element can be changed proportionally to the movement of said weighing member, a sensor oscillator for generating at an output a series of pulses having a period representative of the inductance of said variable inductance element, means connected to receive said pulses and arranged for converting said period of said output pulses from said sensor oscillator into a weight signal indicative of the weight of said load, a display for receiving said weight signal from said converting means and providing an indication of the weight of said load, said sensor oscillator comprising a comparator having an inverting input terminal, a non-inverting input terminal and an output terminal and an integrator having an inverting input terminal, a non-inverting input terminal and an output terminal, said coil of said variable inductance element being connected between said output terminal of said comparator and said non-inverting input terminal of said intergrator, and said output terminal of said comparator being connected to the output of said sensor oscillator.

2. An electronic weighing apparatus as defined in claim 1 wherein said means for converting comprises a first counter for counting a predetermined number of output pulses from said sensor oscillator and outputting a pulse having a pulse width proportional to the time required to count the predetermined number of the output pulses, a clock pulse generator and a second counter for counting the clock pulses from said clock pulse generator for a time period equal to the pulse width of the pulse from said first counter.

3. An electronic weighing apparatus as defined in claim 1 wherein said coil of said variable inductance element consists of at least three windings arranged along the axis of said coil, the outer ones of said windings having a larger number of turns than the inner ones.

4. An electronic weighing apparatus as defined in claim 1 further including a first resistor connected between said non-inverting input terminal of said integrator and said output terminal of said integrator, a second resistor connected between said output terminal of said integrator and said inverting input terminal of said comparator, a third resistor connected between said inverting input of said comparator and said non-inverting input terminal of said comparator and said non-inverting input terminal of integrator being connected to ground.

5. An electronic weighing apparatus as defined in claim 1 including means connected across said coil for linearizing the relation of said period of said output pulses of said sensor oscillator with the moved distance of said magnetic core.

6. An electronic weighing apparatus as defined in claim 4 wherein said means connected across said coil is a compensating resistor.

7. An electronic weighing apparatus as defined in claim 5 further including means connected between the output terminal of the integrator and the non-inverting input terminal of the integrator for compensating for a change in oscillating pulses from the sensor oscillator due to a change in ambient temperature.

8. An electronic weighing apparatus as defined in claim 7 wherein said means connected between the output terminal of the integrator and the non-inverting input terminal of the integrator is a temperature sensitive element.

9. An electronic weighing apparatus as defined in claim 8 wherein said element has a positive temperature coefficient.

10. An electronic weighing apparatus as defined in claim 1 further including means connected across said coil for linearizing the relation of said period of said output pulses of said sensor oscillator with the moved distance of said magnetic core.

11. An electronic weighing apparatus as defined in claim 10 wherein said means connected across said coil is a compensating resistor.

12. An electronic weighing apparatus as defined in claim 10 further including means connected between the output terminal of the integrator and the non-inverting input terminal of the integrator for compensating for a change in oscillating pulses from the sensor oscillator due to a change in ambient temperature.

13. An electronic weighing apparatus as defined in claim 12 wherein said means connected between the output terminal of the integrator and the non-inverting input terminal of the integrator is a temperature sensitive element.

14. An electronic weighing apparatus as defined in claim 13 wherein said element has a positive temperature coefficient.

* * * * *

UNITED STATES PATENT AND TRADEMARK OFFICE
CERTIFICATE OF CORRECTION

PATENT NO. : 4,405,025

DATED : September 20, 1983

INVENTOR(S) : Shuichi Yanagita et al

It is certified that error appears in the above-identified patent and that said Letters Patent is hereby corrected as shown below:

Column 6, line 59 (Claim 6,) "Claim 4" should read
-- Claim 5 --.

Signed and Sealed this

Thirty-first Day of July 1984

[SEAL]

Attest:

GERALD J. MOSSINGHOFF

Attesting Officer

Commissioner of Patents and Trademarks